J. C. SANDER.
METHOD OF BUTT WELDING TUBING.
APPLICATION FILED MAY 21, 1920.

1,363,356. Patented Dec. 28, 1920.

Inventor
JACOB C. SANDER
By his Attorneys

UNITED STATES PATENT OFFICE.

JACOB C. SANDER, OF LYNN, MASSACHUSETTS, ASSIGNOR TO THOMSON ELECTRIC WELDING COMPANY, OF BOSTON, MASSACHUSETTS, A CORPORATION OF MASSACHUSETTS.

METHOD OF BUTT-WELDING TUBING.

1,363,356. Specification of Letters Patent. Patented Dec. 28, 1920.

Application filed May 21, 1920. Serial No. 383,190.

*To all whom it may concern:*

Be it known that I, JACOB C. SANDER, a citizen of the United States, and a resident of Lynn, in the county of Essex and State of Massachusetts, have invented certain new and useful Improvements in Methods of Butt-Welding Tubing, of which the following is a specification.

My present invention relates to a novel method of butt-welding hollow tubing and has for its object to prevent the formation of a bur or upset metal within the tube passage which would close or materially restrict the passage.

In the ordinary electric butt-welding process of joining tube ends a bur or enlargement necessarily forms on the inside as well as the outside of the tube due to the upsetting of the metal in effecting the weld. It is customary to remove the bur from the outside and it is necessary to remove it from the inside to insure the required size passage. To effect the latter it is necessary to re-bore the hole or otherwise remove the bur all of which is extremely expensive and most times practically impossible especially from a commercial standpoint. Also to use a mandrel in the tube passage is most times impractical and it is impossible if the passage in the tube is wavy or crooked.

According to the present invention, a current or jet of preferably compressed air is forced or "shot" through the tube during the entire welding operation, which air continually blows out the heated upset metal and prevents it piling up or adhering in the passage and thereby keeps the passage clear.

The invention consists in the novel method of butt-welding tubes without the formation of a material bur or obstruction within the tube passage as hereinafter more particularly described and then specified in the claims.

Figure 1:
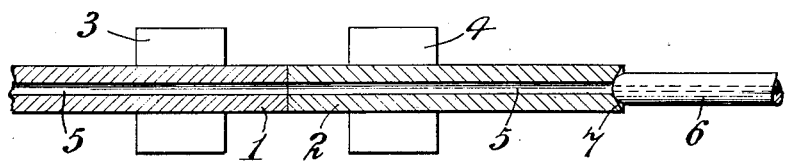

In the accompanying drawings, Figure 1 diagrammatically illustrates two sections of tubing arranged to be welded in accordance with this invention.

Figure 2:
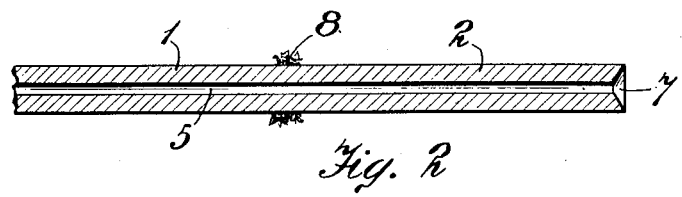

Fig. 2 is a longitudinal section through the tubing after completion of the welding operation.

The sections of tubing 1, 2 to be welded are held in the usual clamps 3, 4 of an electric welding machine of any suitable character. The clamps 3 and 4 form the terminals of the secondary of an electric welding transformer and supply the electric current to the work and also preferably apply the upsetting pressure thereto to weld the abutted tube ends together all as is usual and well understood in the electric welding art.

In the preferred manner of practising this invention the opposed ends of the tube sections 1 and 2 are brought together and the flow of welding current established from one clamp to the other in the usual way by closing the primary switch. As soon as the welding current is established, I preferably relieve all pressure between the opposed tube ends by properly manipulating the upsetting lever by means of which one of the clamps is usually operated to apply the endwise upsetting pressure to the work. This causes a sparking contact across the opposed tube ends. This sparking contact is continued, without pressing the tube ends together, by slowly feeding the tubes toward each other by means of the upsetting lever, until the opposed ends of the work are in practically a fluid state and the metal immediately back of the ends is at a welding temperature. During this time the operation is accompanied by a copious supply of scintillating particles of the work thrown off from between the opposing surfaces, which molten particles are thrown off from the outside of the tube and also into the tube passage. When the operation has reached the stage where the metal back of the tube ends has reached a welding temperature, the work is suddenly and forcibly pressed together endwise by means of the upsetting lever applied to one of the clamps. This results in extruding the overheated metal and welding the tube ends together.

To prevent the thrown off particles and extruded metal forming a bur or remaining in the passage 5 to clog or partially close it, I force a continuous jet or current of air under pressure longitudinally through the passage during the entire time of heating and pressure applying. That is, from the time the current is turned on and particles of molten metal are thrown off, during and through the time of applying the upsetting pressure to complete the weld, air under pressure is passing through the passage 5 so that the molten particles are swept through the passage by the air and the passage is kept clear.

The air may be applied to the passage in any desired way. Preferably I apply the end of a compressed air nozzle 6 receiving its supply of air under pressure from any suitable source to the end of one of the tubes, for instance that indicated at 2. If desired the end of the tube may be counterbored as indicated at 7 to make a fairly tight connection or an air-tight connection between the tube and the air supply may be provided in any other suitable manner.

The result of welding in accordance with this invention is diagrammatically indicated in Fig. 2 in which the only bur which is formed is indicated at 8 on the outside of the tube and which bur may be removed in any well known manner.

The invention is particularly advantageous in welding small size tubing having a small bore or passage and especially when the passage is not straight but it will be understood that it may be used with any size tubing or pipes to which it is applicable.

What I claim as my invention is:—

1. The method of butt-welding tubing consisting in abutting the ends of the tube sections, passing an electric current from one section to the other across the joint and at the same time passing a jet of air through the tube sections and applying pressure to force the sections together while continuing to pass air therethrough.

2. The method of butt-welding tubing consisting in abutting the ends of the tube sections, passing an electric current from one section to the other across the joint and applying endwise pressure to force the sections together and during the heating and pressure forcing a current of air through the tube.

3. The method of butt-welding tubing consisting in abutting the ends of the tube sections, passing an electric current across the abutted ends to establish a sparking from one to the other until the ends have reached a welding temperture, then applying a heavy pressure to weld the ends together and during the heating and application of pressure forcing a current of air longitudinally through the tube.

4. The method of butt-welding tubing consisting in lightly abutting the ends of the tube sections, passing an electric current across the abutted ends to establish a sparking contact between the ends, causing the work to follow up as portions burn away and at the same time maintaining the sparking contact until the ends have reached a welding temperature and then applying a heavy upsetting pressure to force the parts together and complete the weld and during the heating and application of pressure forcing a continuous jet of air through the tube to prevent the formation of a bur in the tube passage.

5. The method of butt-welding tubing consisting in electrically welding the abutted tube ends and at the same time forcing compressed air longitudinally through the tube sections.

6. The method of butt-welding tubing consisting in electrically welding the abutted tube ends by maintaining a sparking contact until the ends have reached the welding temperature and during the entire welding operation forcing a current of air under pressure longitudinally through the tube.

Signed at Lynn in the county of Essex and State of Massachusetts this 19th day of May A. D. 1920.

JACOB C. SANDER.

Witnesses:
RICHARD J. BLACK,
WOLCOTT REMINGTON.